(12) United States Patent
Mimura et al.

(10) Patent No.: US 6,441,529 B1
(45) Date of Patent: Aug. 27, 2002

(54) RELUCTANCE-TYPE MOTOR HAVING WIDENED BOTTOM

(75) Inventors: Naohisa Mimura; Yoshiyuki Takabe, both of Hamamatsu; Shinji Makita; Tomohiro Saitou, both of Kariya; Hideji Yoshida, Hashima, all of (JP)

(73) Assignee: Asmo Co., Ltd., Shizuoka (JP)

( * ) Notice: Subject to any disclaimer, the term of this patent is extended or adjusted under 35 U.S.C. 154(b) by 13 days.

(21) Appl. No.: 09/679,530

(22) Filed: Oct. 6, 2000

(30) Foreign Application Priority Data

Oct. 20, 1999 (JP) .......................... 11-298239

(51) Int. Cl.⁷ .................. H02K 9/10; H02K 1/06; H02K 1/24
(52) U.S. Cl. ................ 310/216; 310/254; 310/168
(58) Field of Search .................. 310/216, 254, 310/168, 261, 162, 166, 42; 29/596–598

(56) References Cited

U.S. PATENT DOCUMENTS

| | | | | |
|---|---|---|---|---|
| 713,604 A | * | 11/1902 | Churchward | 310/216 |
| 737,576 A | * | 9/1903 | Burrow | 310/216 |
| 919,458 A | * | 4/1909 | Poth | 310/216 |
| 3,564,312 A | * | 2/1971 | Bunea | 310/216 |
| 4,186,316 A | * | 1/1980 | Singh | 310/49 R |
| 4,647,802 A | * | 3/1987 | Konecny | 310/49 R |
| 5,804,896 A | * | 9/1998 | Takehara et al. | 310/67 R |
| 5,844,346 A | * | 12/1998 | Kolomeitsev et al. | 310/254 |
| 6,025,668 A | * | 2/2000 | Kolomeitsev | 310/187 |

FOREIGN PATENT DOCUMENTS

JP 8-126273 5/1996

* cited by examiner

Primary Examiner—Tran Nguyen
(74) Attorney, Agent, or Firm—Law Offices of David G. Posz

(57) ABSTRACT

A reluctance-type motor comprises, for each of its rotor and stator, a core that has a cylindrical ring and a plurality of salient poles protruding from the ring in a radial direction of the ring. Each pole has a bottom width and a top width in a circumferential direction of the core at its bottom and at its top, respectively. The bottom width is sized to be larger than the top width, and the ring has a width sized to be larger than a half of the top width of the pole. The pole may be shaped to have a round corner at the bottom or in a trapezoid in which the bottom width is larger than the top width. The core may have a plurality of thin magnetic plates stacked in an axial direction of the core, each plate has a plurality slits in each protrusion which forms the pole, and each plate has a thickness which is less than 5 times of a maximum width of each slit.

19 Claims, 5 Drawing Sheets

US 6,441,529 B1

RELUCTANCE-TYPE MOTOR HAVING WIDENED BOTTOM

CROSS REFERENCE TO RELATED APPLICATION

This application is based on and incorporates herein by reference Japanese Patent Application No. 11-298239 filed Oct. 20, 1999.

BACKGROUND OF THE INVENTION

1. Field of the Invention

The present invention relates to a reluctance-type motor which is multiple-phase half-wave energized.

2. Related Art

A reluctance-type motor produces high output torque and has simple construction. However, it is used in only limited fields, because it also produces high ripple in the output torque. When a protruded salient pole of a rotor and a protruded salient pole of a stator completely face each other, that is, align in phase, during the rotation of the rotor rotation, magnetic resistance between poles decreases thereby causing magnetic saturation and hence the ripple in the output torque.

The reluctance-type motor is typically constructed as shown in FIG. 8. A rotor has protruded poles 100 on a rotor ring 102, and a stator has protruded poles 101 on a stator ring 103. Poles 100 and 101 protrude from the rings 102 and 103, respectively. It is assumed that each protruded pole 100 of the rotor has the same widths rD1 and rD2 (rD1=rD2) at its bottom (root) and top (free end) in a rotation direction, and that each protruded pole 101 of the stator has the same widths sD1 and sD2 (sD1=sD2) at its bottom and top in a rotation direction. In this instance, the magnetic flux concentrates in the angled corner part between pole and the ring. As a result, the magnetic saturation occurs when poles 100 and 101 completely face each other in a radial direction, thus greatly decreasing the output torque as shown in FIG. 3A.

It is also assumed that the ring 102 has a width rW in the radial direction, which is less than a half of the width rD2 of pole 100 (rW<0.5×rD2), and that the ring 103 has a width sW in the radial direction, which is less than a half of the width sD2 of pole 101 (sW<0.5×sD2). In this instance, the magnetic flux generated in the pole cannot flow sufficiently into the ring thereby causing the magnetic maturation when poles 100 and 101 completely face each other. As a result, the output torque sharply decreases as shown in FIG. 4A resulting in the ripple in the output torque.

SUMMARY OF THE INVENTION

It is therefore an object of the present invention to provide a reluctance-type motor that has less drop in output torque and hence less ripple in the output torque even salient poles of a rotor and a stator completely face each other.

According to the present invention, a reluctance-type motor comprises a core for a rotor or a stator. The core has a cylindrical ring and a plurality of salient poles protruding from the ring in a radial direction of the ring. Each pole has a bottom width and a top width in a circumferential direction of the core at its bottom which is connected to the ring and at its top which is away from the ring, respectively. The bottom width (D1) is sized to be larger than the top width (D2), and the ring has a width in a radial direction of the core to allow at least a half of magnetic flux in the pole to pass through the ring.

Preferably, the width of the ring is sized to be larger than a half of the top width of the pole. The pole is shaped to have a round corner at the bottom or in a trapezoid in which the bottom width is larger than the top width. The core has a plurality of thin magnetic plates stacked in an axial direction of the core, each plate has a plurality slits in each protrusion which forms the pole, and each plate has a thickness which is less than 5 times of a maximum width of each slit.

BRIEF DESCRIPTION OF THE DRAWINGS

The above and other objects of the present invention will become more apparent from the following detailed description made with reference to the accompanying drawings. In the drawings.

DETAILED DESCRIPTION OF THE PREFERRED EMBODIMENT (First Embodiment)

Figure 1:
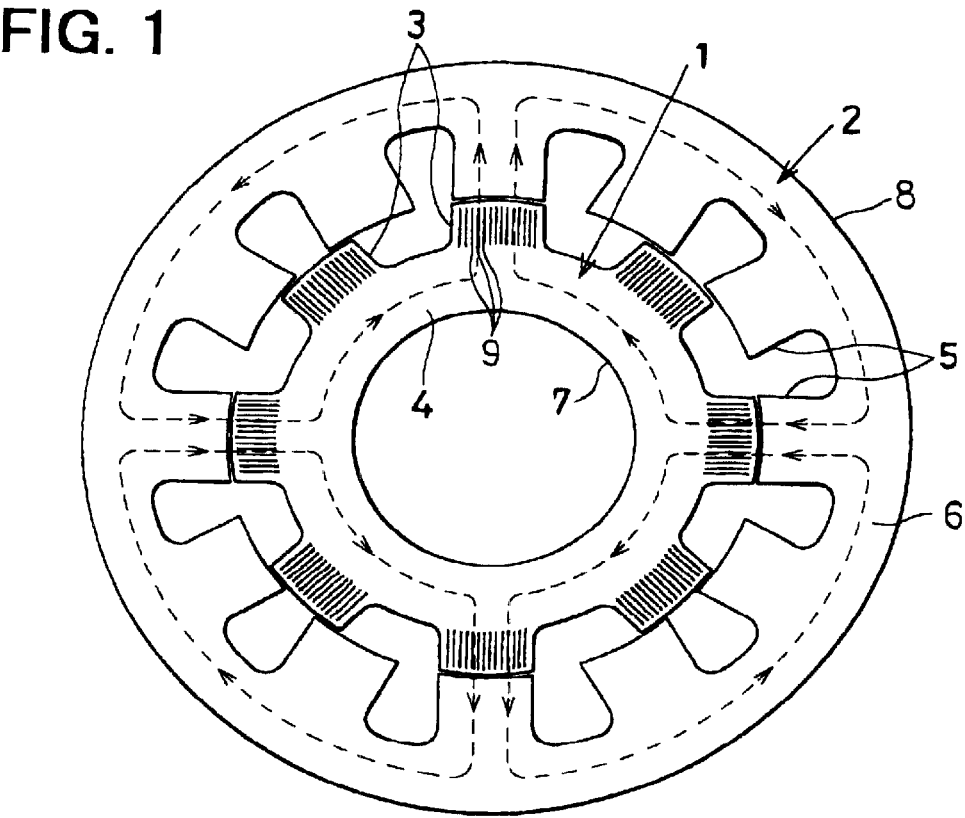
FIG. 1 is a schematic view showing a reluctance-type motor according to a first embodiment of the present invention.

Referring first to FIG. 1, a reluctance-type motor comprises a rotor core 1 and a stator core 2. The rotor core 1 has a cylindrical ring 4 and a plurality of (e.g., 8) salient poles (rotor poles) 3 each protruding outward from the ring 4 in the radial direction. The rotor pole 3 is formed with a plurality of (e.g., 12) slits 9. The stator core 2 has a cylindrical ring 6 and a plurality of salient poles (stator poles) 5 each protruding inward from the ring 6 in the radial direction. The rotor core 1 and the stator core 2 are constructed with a plurality of thin magnetic plates 7 and 8 stacked in an axial direction, respectively.

Figure 2:
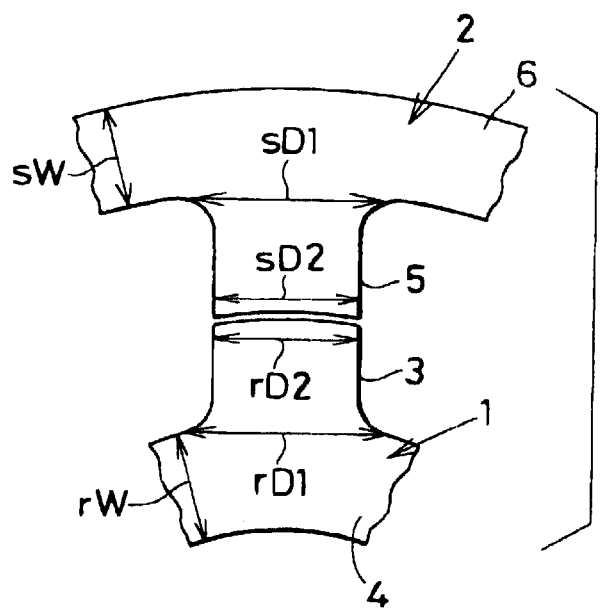
FIG. 2 is a partial enlarged view showing a rotor and a stator of the reluctance-type motor according to the first embodiment.

As shown in FIG. 2, the rotor pole 3 is shaped to have different widths rD1 and rD2 in the rotation direction, that is, in the circumferential direction of the rotor core 1, at its bottom (root) and top (free end), respectively. Specifically, the bottom width rD1 is sized to be larger than the top width rD2 (rD1>rD2). The stator pole 5 is also shaped to have different widths sD1 and sD2 at its bottom and top, respectively. Specifically, the bottom width rD1 is sized to be larger than the top width sD2 (sD1>sD2). Thus, the poles 3 and 5 have widened bottoms, respectively.

Figure 3A:
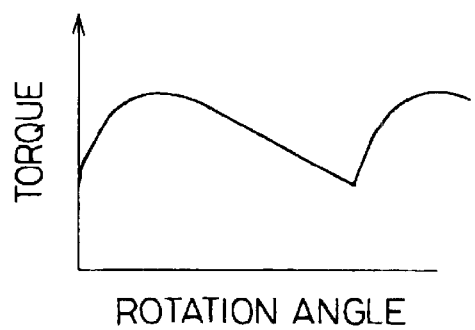
FIGS. 3A and 3B are characteristics diagrams showing torque outputs of reluctance-type motors according to a related art and the first embodiment, respectively.
Figure 3B:
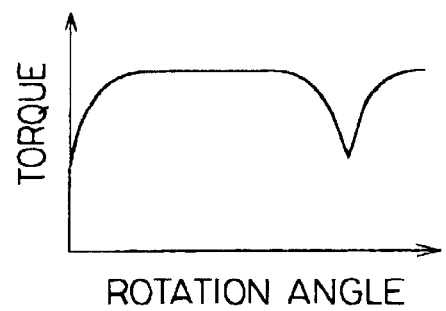

The above dimensional relations are attained by providing rounded corners on the bottom of the pole, that is, between the ring and the pole in each of the rotor core 1 and the stator core 2. The rounded corner lessens concentration of magnetic flux in the widened bottom of the pole. The decrease in the output torque is minimized as shown in FIG. 3B even when the rotor poles 3 rotates to a position where it completely align in phase with the stator pole 5, thus resulting in less ripple in the output torque during rotation of the rotor core 1.

Further, as shown in FIG. 2, the rotor ring 4 and the stator ring 6 are shaped to have widths rW and sW in the radial direction, respectively. The ring widths rW and sW are sized to be equal to or larger than a half of the top width rD2 (rW. 0.5×rD2) and than a half of the top width sD2 (sW. 0.5× sD2), respectively. The magnetic flux in the pole 5 is divided into two in the ring 6 as shown by dotted lines in FIG. 1, and hence the width sW of the ring 6 may be a half of the width sD2 of the pole 5. However, in this embodiment, rW and sW are preferably sized to be larger than 0.5×rD2 and 0.5×sD2, respectively.

Figure 4A:
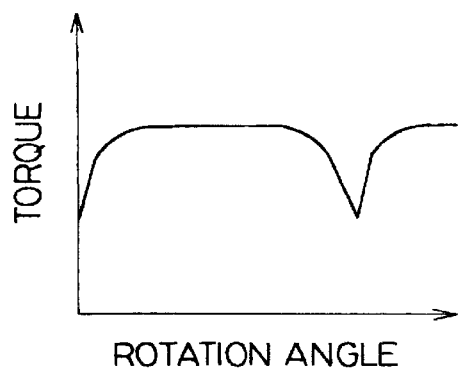
FIGS. 4A and 4B are characteristics diagrams showing torque outputs of reluctance-type motors according to a related art and the first embodiment, respectively.
Figure 4B:
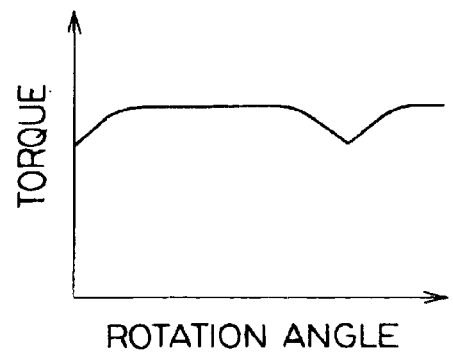

According to this dimensional relationship of the rings 4 and 6, the magnetic flux increases as the magnetic resistance decreases, when the rotor pole 3 rotates to a position where it completely face the stator pole 5. The increased magnetic flux in the poles is allowed to flow into the rings without magnetic saturation. That is, the concentration of magnetic flux is reduced and hence the magnetic saturation is restricted. Thus, the output torque drops less as shown in FIG. 4B, even when the rotor pole rotates to the position where it completely face the stator pole 5.

Figure 5:
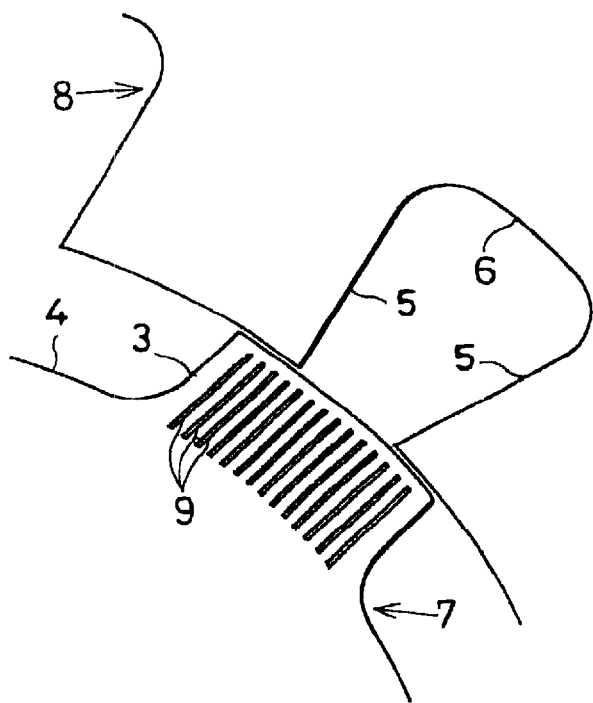
FIG. 5 is a partial enlarged view showing the rotor and the stator of the reluctance-type motor according to the first embodiment.

Each slit 9 formed in the rotor pole 3 extends in the radial direction and in the axial direction of the rotor core 1 as shown in FIGS. 1 and 5. The slits 9 direct the magnetic flux passing through the rotor pole 3 to flow in the radial direction so that the magnetic flux increases as the rotor pole 3 rotates closer to the stator pole 5. Thus, the ripple in the output torque is more reduced.

Figure 6:
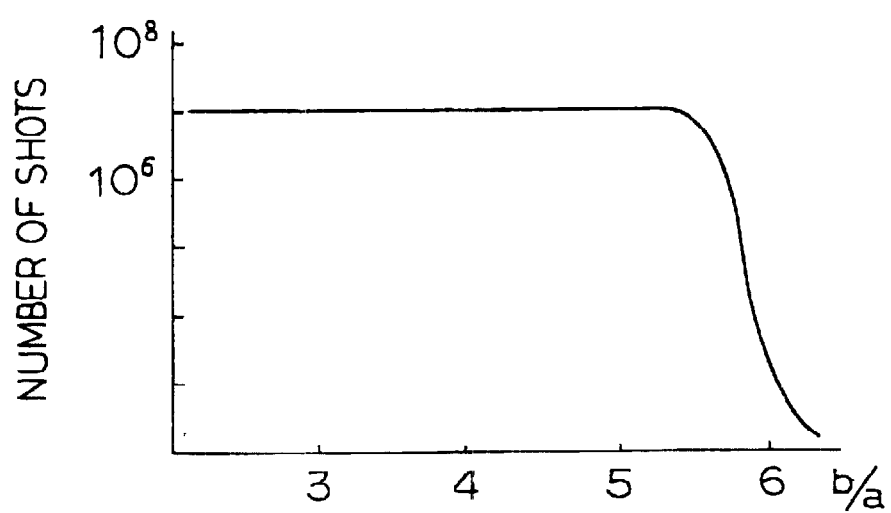
FIG. 6 is a graph showing a relationship between the longevity of dies and a ratio of plate thickness (b) to a slit width (a)

The slits 9 are preferably formed by a pressing process at the same time as the rotor core 1 is pressed to shape so that manufacturing process may be minimized. A pressing die used in the pressing process is preferably maintained usable as long as possible to reduce a manufacturing cost. As shown in FIG. 6, the longevity of the die, that is, the number of attainable pressing operations (shots) varies with a ratio b/a of the thickness (b) of each rotor plate 7 to the width (a) of each slit 9. The ratio b/a should be limited to around 5. That is, the rotor plate thickness should be limited to be less than 5 times or so of the maximum slit width so that the pressing die may be used as many times as possible.

(Second Embodiment)

Figure 7:
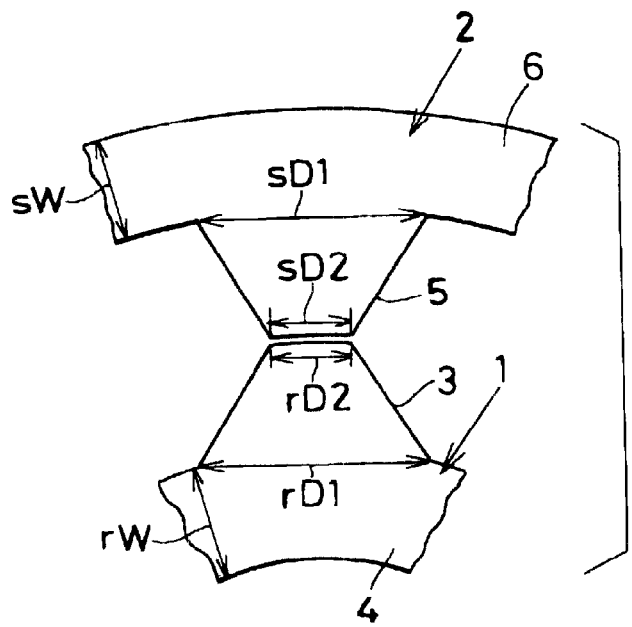
FIG. 7 is a partial enlarged view showing a rotor and a stator of a reluctance-type motor according to a second embodiment of the present invention.
Figure 8:
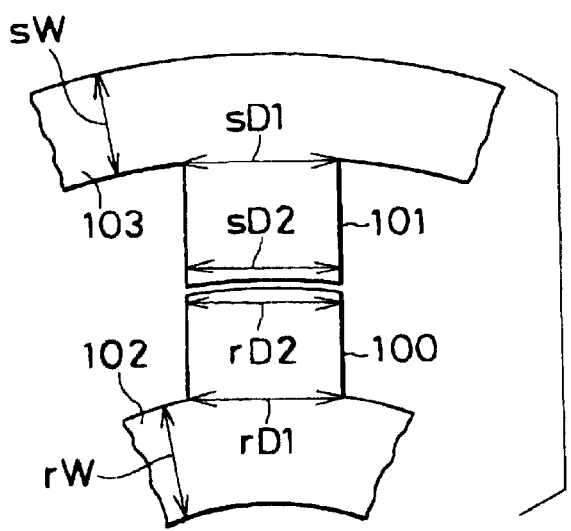
FIG. 8 is a partial enlarged view showing a rotor and a stator of a reluctance-type motor according to a related art.

In a second embodiment, as shown in FIG. 7, each of the poles 3 and 5 is shaped in a trapezoid with the bottom widths rD1 and rD2 being larger than the top widths rD2 and sD2, respectively. This second embodiment also provides the same advantage as the first embodiment.

(Modification)

Figure 9:
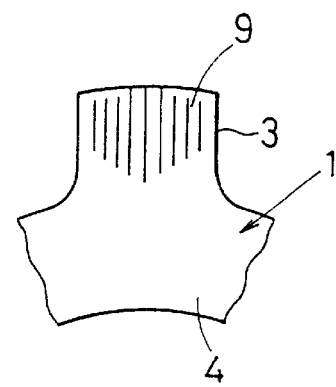
FIG. 9 is a partial enlarged view showing a rotor of a reluctance-type motor according to a first modification.

The slits 9 may be formed only in the stator pole 5 or in both of the poles 3 and 5. Referring to FIG. 9, each slit 9 need not be a closed-type but may be an open-type in which the slit 9 passes through the top surface of the rotor pole. The slits 9 in each pole need not be in complete alignment with one another but may be differentiated in length or in position to further reduce the ripple in the output torque.

Figure 10:
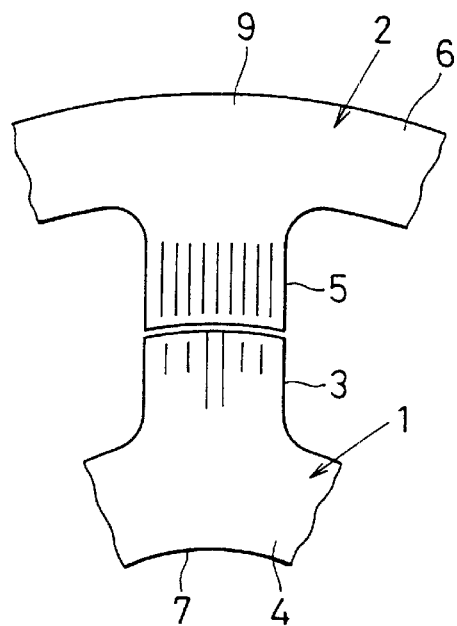
FIG. 10 is a partial enlarged view showing a rotor and a stator of a reluctance-type motor according to a second modification.
Figure 11:
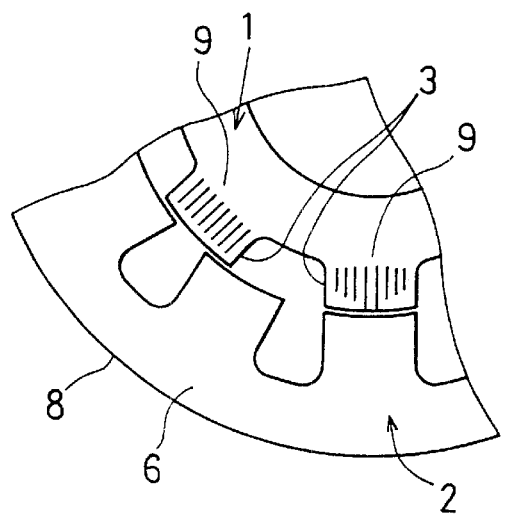
FIG. 11 is a partial view showing a rotor and a stator of a reluctance-type motor according to a third modification.

Referring to FIG. 10 the slits may further be formed differently between adjacent two of the thin magnetic plates in such a manner that at least one of positions, numbers and widths of the slits are different with respect to the protrusions which provides the same pole. The slits may be formed differently between adjacent two groups of the thin magnetic plates in such a manner that at least one of positions, numbers and widths of the slits are different with respect to the protrusions which provides the same pole. Referring to FIG. 11, the slits may be formed differently between adjacent two of protrusions of each thin magnetic plate in such a manner that at least one of positions, numbers and widths of the slits are different, and the thin magnetic plates may be stacked one another in such a manner that the protrusions having different slit shapes are stacked in the axial direction.

The present invention should not be limited to the above embodiments and modifications, but may be implemented in many other ways without departing from the spirit of the invention.

What is claimed is:

1. A reluctance-type motor comprising:
   a core having a cylindrical ring and a plurality of salient poles protruding from the cylindrical ring in a radial direction of the cylindrical ring,
   wherein each of the plurality of salient poles has a bottom width and a top width in a circumferential direction of the core, the bottom width is connected to the cylindrical ring and the top width is away from the ring, respectively, with the bottom width being sized to be larger than the top width,
   wherein the cylindrical ring has a width in a radial direction of the core to allow at least a half of a magnetic flux in the each of the plurality of salient poles to pass through the cylindrical ring,
   wherein the core has a plurality of thin magnetic plates stacked in an axial direction of the core,
   wherein each of the plurality of thin magnetic plates has a plurality of slits in the each of the plurality of salient poles,
   wherein the each of the plurality of thin magnetic plates has a thickness that is less than 5 times of a maximum width of each of the plurality of slits, and
   wherein the plurality of slits are formed differently between adjacent two of the thin magnetic plates in such a manner that at least one of positions, numbers and widths of the plurality of slits are different.

2. The reluctance-type motor as in claim 1, wherein the width of the cylindrical ring is sized to be larger than a half of the top width of the plurality of salient poles.

3. The reluctance-type motor as in claim 1, wherein each of the plurality of salient poles is shaped to have a round corner at the bottom width.

4. The reluctance-type motor as in claim 1, wherein each of the plurality of salient poles is shaped in a trapezoid, wherein the bottom width is larger than the top width.

5. The reluctance-type motor as in claim 1, wherein the plurality of slits extends in the radial direction of the core only inside a surface of the top of the core.

6. The reluctance-type motor as in claim 1, wherein the plurality of slits extends through a surface of the top of the pole in the radial direction of the core.

7. A reluctance-type motor comprising:
   a core having a cylindrical ring and a plurality of salient poles protruding from the cylindrical ring in a radial direction of the cylindrical ring,
   wherein each of the plurality of salient poles has a bottom width and a top width in a circumferential direction of the core, the bottom width is connected to the cylindrical ring and the top width is away from the ring, respectively, with the bottom width being sized to be larger than the top width, wherein the cylindrical ring has a width in a radial direction of the core to allow at least a half of a magnetic flux in the each of the plurality of salient poles to pass through the cylindrical ring, wherein the core has a plurality of thin magnetic plates stacked in an axial direction of the core, wherein each of the plurality of thin magnetic plates has a plurality of slits in the each of the plurality of salient poles, wherein the each of the plurality of thin magnetic plates has a thickness that is less than 5 times of a maximum width of each of the plurality of slits, wherein the plurality of salient slits are formed differentially between adjacent two groups of the thin magnetic plates in such a manner that at least one of positions, numbers and widths of the plurality of salient slits are different.

8. The reluctance-type motor as in claim 7, wherein the width of the cylindrical ring is sized to be larger than a half of the top width of the plurality of salient poles.

9. The reluctance-type motor as in claim 7, wherein each of the plurality of salient poles is shaped to have a round corner at the bottom width.

10. The reluctance-type motor as in claim 7, wherein each of the plurality of salient poles is shaped in a trapezoid, wherein the bottom width is larger than the top width.

11. The reluctance-type motor as in claim 7, wherein the plurality of slits extends in the radial direction of the core only inside a surface of the top of the core.

12. The reluctance-type motor as in claim 7, wherein the plurality of slits extends through a surface of the top of the pole in the radial direction of the core.

13. A reluctance-type motor comprising:

a core having a cylindrical ring and a plurality of salient poles protruding from the cylindrical ring in a radial direction of the cylindrical ring, wherein each of the plurality of salient poles has a bottom width and a top width in a circumferential direction of the core, the bottom width is connected to the cylindrical ring and the top width is away from the ring, respectively, with the bottom width being sized to be larger than the top width, wherein the cylindrical ring has a width in a radial direction of the core to allow at least a half of a magnetic flux in the each of the plurality of salient poles to pass through the cylindrical ring, wherein the core has a plurality of thin magnetic plates stacked in an axial direction of the core, wherein each of the plurality of thin magnetic plates has a plurality of slits in the each of the plurality of salient poles, wherein the each of the plurality of thin magnetic plates has a thickness that is less than 5 times of a maximum width of each of the plurality of slits, wherein the plurality of salient slits are formed differentially between two adjacent salient poles of the thin magnetic plates in such a manner that at least one of positions, numbers and widths of the plurality of salient slits are different.

14. The reluctance-type motor as in claim 13, wherein the width of the cylindrical ring is sized to be larger than a half of the top width of the plurality of salient poles.

15. The reluctance-type motor as in claim 13, wherein each of the plurality of salient poles is shaped to have a round corner at the bottom width.

16. The reluctance-type motor as in claim 13, wherein each of the plurality of salient poles is shaped in a trapezoid, wherein the bottom width is larger than the top width.

17. The reluctance-type motor as in claim 13, wherein the plurality of slits extends in the radial direction of the core only inside a surface of the top of the core.

18. The reluctance-type motor as in claim 13, wherein the plurality of slits extends through a surface of the top of the pole in the radial direction of the core.

19. The reluctance-type motor as in claim 13, wherein:

the core further comprises a rotor core and a stator core, and both the rotor core and the stator core include the cylindrical ring and the plurality of salient poles; and the stator core surrounds the rotor core, and a portion of the plurality of salient poles of the rotor core is adjacent with a portion of the plurality of salient poles of the stator core.

* * * * *